US009977146B2

United States Patent
Kirkhope et al.

(10) Patent No.: US 9,977,146 B2
(45) Date of Patent: May 22, 2018

(54) GAMMA DETECTION SENSORS IN A ROTARY STEERABLE TOOL

(71) Applicant: Halliburton Energy Services, Inc., Houston, TX (US)

(72) Inventors: Kennedy J. Kirkhope, Leduc (CA); Alben D'Silva, Edmonton (CA)

(73) Assignee: Halliburton Energy Services, Inc., Houston, TX (US)

( * ) Notice: Subject to any disclaimer, the term of this patent is extended or adjusted under 35 U.S.C. 154(b) by 0 days. days.

(21) Appl. No.: 15/540,158

(22) PCT Filed: Feb. 19, 2015

(86) PCT No.: PCT/US2015/016580
§ 371 (c)(1),
(2) Date: Jun. 27, 2017

(87) PCT Pub. No.: WO2016/133519
PCT Pub. Date: Aug. 25, 2016

(65) Prior Publication Data
US 2017/0351004 A1    Dec. 7, 2017

(51) Int. Cl.
*G01V 5/12*    (2006.01)
*G01V 5/06*    (2006.01)
(Continued)

(52) U.S. Cl.
CPC ............... *G01V 5/12* (2013.01); *G01T 1/20* (2013.01); *G01V 5/06* (2013.01); *E21B 47/00* (2013.01)

(58) Field of Classification Search
CPC .... G01V 5/12; G01V 5/06; G01T 1/20; E21B 47/00

(Continued)

(56) References Cited

U.S. PATENT DOCUMENTS 5,047,635 A    9/1991  Leaney et al.
5,448,227 A    9/1995  Orban et al.
(Continued)

FOREIGN PATENT DOCUMENTS

EP    1169656 B1    4/2014

OTHER PUBLICATIONS

International Preliminary Report on Patentability issued in related PCT Application No. PCT/US2015/016580, dated Aug. 31, 2017 (12 pages).

(Continued)

*Primary Examiner* — David Porta
*Assistant Examiner* — Gisselle Gutierrez
(74) *Attorney, Agent, or Firm* — Alan Bryson; Baker Botts L.L.P.

(57) ABSTRACT

In accordance with embodiments of the present disclosure, a rotary steerable tool and a gamma sensor assembly are provided. These systems may include scintillation detection sensors mounted in a pressure sleeve assembly coupled to a rotating drive shaft and/or an electronics insert of the rotary steerable tool. The sensors may each be mounted in an atmospheric pressure environment within a respective pressure sleeve. The pressure sleeves may each rotate with the drive shaft and the electronics insert. The sonde-based arrangement of the systems may facilitate relatively high sensitivity measurements taken at a rotating portion of the rotary steerable tool. This may allow directional gamma measurements and bulk gamma measurements to be determined at the rotating section of rotary steerable tool.

20 Claims, 6 Drawing Sheets

(51) Int. Cl.
*G01T 1/20* (2006.01)
*E21B 47/00* (2012.01)

(58) Field of Classification Search
USPC .................................................. 250/269.3
See application file for complete search history.

(56) References Cited

U.S. PATENT DOCUMENTS

| | | | |
|---|---|---|---|
| 5,706,905 A | 1/1998 | Barr | |
| 6,057,784 A | 5/2000 | Schaaf et al. | |
| 6,109,372 A | 8/2000 | Dorel et al. | |
| 6,179,066 B1 | 1/2001 | Nasr et al. | |
| 6,272,434 B1 | 8/2001 | Wisler et al. | |
| 6,328,119 B1* | 12/2001 | Gillis | E21B 7/062 |
| | | | 175/325.1 |
| 6,427,783 B2 | 8/2002 | Krueger et al. | |
| 6,446,736 B1* | 9/2002 | Kruspe | E21B 33/1243 |
| | | | 166/66 |
| 6,637,524 B2 | 10/2003 | Kruspe et al. | |
| 6,766,854 B2 | 7/2004 | Ciglenec et al. | |
| 6,843,332 B2 | 1/2005 | Eppink et al. | |
| 6,885,188 B2 | 4/2005 | Russell | |
| 7,083,006 B2 | 8/2006 | Kruspe et al. | |
| 7,114,565 B2 | 10/2006 | Estes et al. | |
| 7,692,428 B2 | 4/2010 | Clark et al. | |
| 7,950,473 B2 | 5/2011 | Sugiura | |
| 8,058,619 B2 | 11/2011 | Jones | |
| 8,162,076 B2 | 4/2012 | Martinez et al. | |
| 8,201,645 B2 | 6/2012 | Hall et al. | |
| 8,258,976 B2 | 9/2012 | Price et al. | |
| 8,421,004 B2 | 4/2013 | Molz et al. | |
| 8,455,812 B2 | 6/2013 | Nikitin et al. | |
| 8,497,685 B2 | 7/2013 | Sugiura | |
| 8,530,827 B2 | 9/2013 | Duraj | |
| 8,794,318 B2 | 8/2014 | Harrigan et al. | |
| 2013/0292110 A1 | 11/2013 | Fraser et al. | |
| 2014/0084946 A1* | 3/2014 | Clark | G01N 27/02 |
| | | | 324/654 |
| 2014/0124659 A1 | 5/2014 | Berheide et al. | |
| 2014/0151031 A1* | 6/2014 | Reiderman | E21B 47/00 |
| | | | 166/250.01 |
| 2014/0262507 A1* | 9/2014 | Marson | E21B 7/10 |
| | | | 175/24 |
| 2015/0361766 A1* | 12/2015 | Downie | E21B 41/0085 |
| | | | 175/41 |
| 2017/0329042 A1* | 11/2017 | Dodds | G01V 5/12 |

OTHER PUBLICATIONS

International Search Report and Written Opinion issued in related PCT Application No. PCT/US2015/016580 dated Oct. 29, 2015, 15 pages.

* cited by examiner

GAMMA DETECTION SENSORS IN A ROTARY STEERABLE TOOL

CROSS-REFERENCE TO RELATED APPLICATION

The present application is a U.S. National Stage Application of International Application No. PCT/US2015/016580 filed Feb. 19, 2015, which is incorporated herein by reference in its entirety for all purposes.

TECHNICAL FIELD

The present disclosure relates generally to rotary steerable tools and, more particularly, to systems and methods for packaging gamma radiation sensors in the rotating section of rotary steerable tools.

BACKGROUND

Hydrocarbons, such as oil and gas, are commonly obtained from subterranean formations that may be located onshore or offshore. The development of subterranean operations and the processes involved in removing hydrocarbons from a subterranean formation typically involve a number of different steps such as, for example, drilling a wellbore at a desired well site, treating the wellbore to optimize production of hydrocarbons, and performing the necessary steps to produce and process the hydrocarbons from the subterranean formation.

Wellbores are created for a variety of purposes, including exploratory drilling for locating underground deposits of different natural resources, mining operations for extracting such deposits, and construction projects for installing underground utilities. Wellbores are often drilled vertically through a subterranean formation. However, in many applications it is desirable to drill wellbores that have vertically deviated or horizontal geometries. A well-known technique employed for drilling horizontal, vertically deviated, and other complex boreholes is directional drilling. Directional drilling is generally typified as a process of boring a hole which is characterized in that at least a portion of the course of the bore hole in the earth is in a direction other than strictly vertical—i.e., the axes make an angle with a vertical plane (known as "vertical deviation"), and are directed in an azimuth plane.

Various options are available for providing steering capabilities to a drilling tool for controlling and varying the direction of the wellbore. For example, directional drilling may also be accomplished with a "rotary steerable" drilling system wherein the entire drill pipe string is rotated from the surface, which in turn rotates the bottom hole assembly (BHA), including the drilling bit, connected to the end of the drill pipe string. In a rotary steerable drilling system, the drilling string may be rotated while the drilling tool is being steered either by being pointed or pushed in a desired direction (directly or indirectly) by a steering device. Some rotary steerable drilling systems include a component which is non-rotating relative to the drilling string in order to provide a reference point for the desired direction and a mounting location for the steering devices. Other rotary steerable drilling systems may be "fully rotating". Rotary steerable drilling systems can provide relatively high steering accuracy for directional drilling operations.

Directional drilling typically involves controlling and varying the direction of the wellbore as it is being drilled. Oftentimes the goal of directional drilling is to reach a position within a target subterranean destination or formation with the drill string. Downhole sensors in the rotary steerable system can be used to evaluate the formations being drilled through, in order to determine what changes in direction of the rotary steerable tool should be made. Some downhole tools utilize gamma detection sensors that are designed to measure an amount of natural gamma radiation emitted from a subterranean formation. Such information can be useful since pay-zones and formations containing oil will oftentimes emit more gamma radiation than less productive formations. Unfortunately, gamma detection sensors are often housed in non-rotating parts of the drill string, or located far above the drill bit, making it difficult to base quick directional decisions on the sensed gamma radiation.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
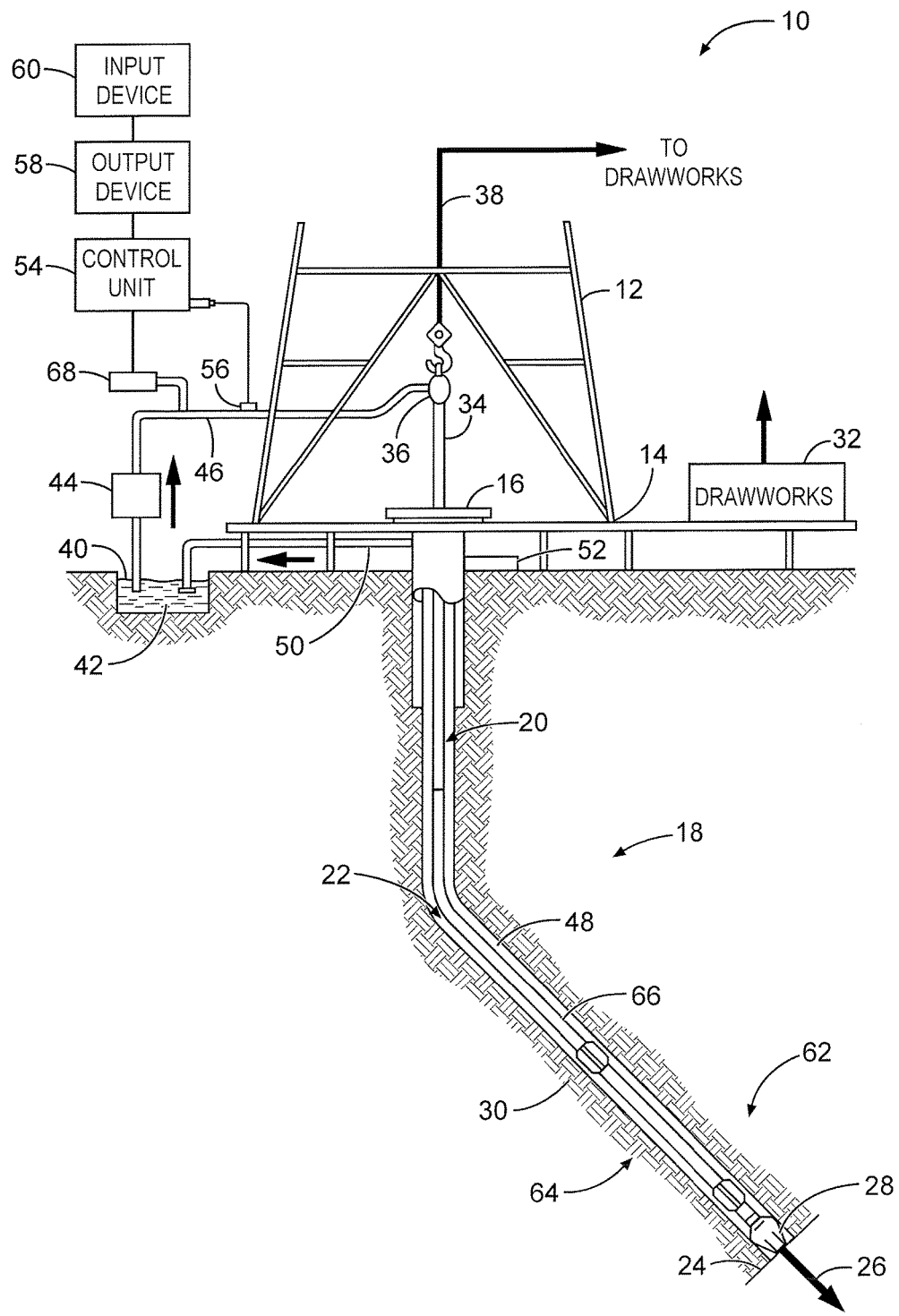
FIG. 1 is a schematic illustration of a drilling system with a rotary steerable tool, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments according to the present disclosure may be directed to systems and methods for sensing gamma radiation in a rotating section of a rotary steerable tool to take measurements of natural gamma radiation of formations while drilling. Such rotary steerable tools are generally used to perform directional drilling operations. Directional drilling typically involves controlling and varying the direction of the wellbore as it is being drilled. Oftentimes the goal of directional drilling is to reach a position within a target subterranean destination or formation with the drill string. For instance, the drilling direction may be controlled to direct the wellbore towards a desired target destination, to control the wellbore horizontally to maintain it within a desired pay zone, or to correct for unwanted or undesired deviations from a desired or predetermined path. Frequent adjustments to the direction of the wellbore are often applied during a drilling operation, either to accommodate a planned change in direction or to compensate for unintended or unwanted deflection of the wellbore.

Naturally emitted gamma radiation in the formations can provide insight into the makeup and desirability of the formations being drilled through by a rotary steerable tool. Accordingly, it is desirable to perform gamma radiation measurements in order to inform decisions on controlling and varying the direction of the wellbore as it is being drilled. Many rotary steerable tools do not have gamma detection capabilities at all. Other existing rotary steerable tools may work in conjunction with formation evaluation tools (with gamma sensors) that are disposed higher up in the drill string to take rotating gamma measurements. However, in order to make better geo-steering decisions based on gamma measurements, it may be desirable to take these measurements via gamma detection sensors at or near the drill bit. Measurements near the bit may allow for the most accurate and quickest steering decisions to be made for either continuing drilling through the desired formations or avoiding certain types of formations. However, at present, any tools that feature gamma sensors near the drill bit have these sensors located in a non-rotating section of the drill string.

The disclosed embodiments are directed to rotary steering tools and gamma sensor sections of such tools that are designed address these shortcomings. The systems disclosed herein may include scintillation detection sensors mounted in a pressure sleeve assembly coupled to a rotating drive shaft and/or electronics insert of the rotary steerable tool. The sensors may each be mounted in a respective pressure sleeve designed to provide an atmospheric pressure environment. The pressure sleeves may each rotate with the drive shaft and the electronics insert. The arrangement of the systems described below may facilitate relatively high sensitivity measurements to be taken at a rotating portion of the rotary steerable tool.

In some embodiments, the disclosed gamma sensor section may be used to take bulk gamma measurements at the rotating section of the rotary steerable tool, based on the amount of sensed gamma radiation collected via the gamma detection sensors arranged around the drive shaft of the rotary steerable tool. In other embodiments, the gamma sensor section may be equipped with one or more shielding components (e.g., tungsten shields) that may be positioned in the available spaces around the individual sonde-packaged gamma detection sensors. The shielding components may prevent certain gamma detection sensors from detecting gamma radiation emitted from certain directions within the wellbore. Therefore, such arrangements of the gamma sensor section may be utilized to determine azimuthal (i.e., directional) gamma measurements at the rotating section of rotary steerable tool.

Turning now to the drawings, FIG. 1 illustrates a directional drilling system, designated generally as 10, in accordance with aspects of the present disclosure. Many of the disclosed concepts are discussed with reference to drilling operations for the exploration and/or recovery of subsurface hydrocarbon deposits, such as petroleum and natural gas. However, the disclosed concepts are not so limited, and can be applied to other drilling operations. To that end, the aspects of the present disclosure are not necessarily limited to the arrangement and components presented in FIG. 1. For example, many of the features and aspects presented herein can be applied in horizontal drilling applications and vertical drilling applications without departing from the intended scope and spirit of the present disclosure.

The directional drilling system 10 exemplified in FIG. 1 includes a tower or "derrick" 12 that is buttressed by a rig floor 14. The rig floor 14 may support a rotary table 16 that is driven at a desired rotational speed to provide rotational force to a drill string 18. The drill string 18, which may include a drill pipe section 20, extends downwardly from the rotary table 16 into a directional wellbore 22. As illustrated, the wellbore 22 may travel along a multi-dimensional path or "trajectory." The three-dimensional direction of a bottom 24 of the wellbore 22 of FIG. 1 is represented by a pointing vector 26.

A drill bit 28 is generally attached to the distal, downhole end of the drill string 18. When rotated, e.g., via the rotary table 16, the drill bit 28 may operate to break up and generally disintegrate a geological formation 30. The drill string 18 may be coupled to a "drawworks" hoisting apparatus 32, for example, via a kelly joint 34, swivel 36, and line 38 through a pulley system (not shown). The drawworks 32 may include various components, such as a drum, one or more motors, a reduction gear, a main brake, and an auxiliary brake. During a drilling operation, the drawworks 32 may be operated, in some embodiments, to control the weight on the bit 28 and the rate of penetration of the drill string 18 into the wellbore 22. The operation of the drawworks 32 is generally known and is thus not described in detail herein.

During drilling operations, a suitable drilling fluid (commonly referred to as "mud") 40 may be circulated, under pressure, out from a mud pit 42 and into the wellbore 22 through the drill string 18 by a hydraulic "mud pump" 44. The drilling fluid 40 may include, for example, water-based muds, oil-based muds, synthetic-based muds, as well as gaseous drilling fluids. The drilling fluid 40 may pass from the mud pump 44 into the drill string 18 via a fluid conduit (commonly referred to as a "mud line") 46 and the kelly joint 34. The drilling fluid 40 may be discharged at the wellbore bottom 24 through an opening or nozzle in the drill bit 28, and circulate in an "uphole" direction towards the surface through an annulus 48 between the drill string 18 and the wall of the wellbore 22. As the drilling fluid 40 approaches the rotary table 16, it may be discharged via a return line 50 into the mud pit 42. A variety of surface sensors 52, which are appropriately deployed on the surface of the wellbore 22, may operate alone or in conjunction with downhole sensors deployed within the wellbore 22, to provide information about various drilling-related parameters, such as fluid flow rate, weight on bit, and hook load, among others.

A surface control unit 54 may receive signals from surface and downhole sensors and devices via a sensor or transducer 56, which can be placed on the fluid line 46. The surface control unit 54 may be operable to process such signals according to programmed instructions provided to the surface control unit 54. The surface control unit 54 may present to an operator desired drilling parameters and other information via one or more output devices 58, such as a display, a computer monitor, speakers, lights, etc., which may be used by the operator to control the drilling operations. The surface control unit 54 may contain a computer, memory for storing data, a data recorder, and other known and hereinafter developed peripherals. The surface control unit 54 may also include models and may process data according to programmed instructions, and respond to user commands entered through a suitable input device 60, which may be in the nature of a keyboard, touchscreen, microphone, mouse, joystick, etc.

In some embodiments of the present disclosure, the rotatable drill bit 28 is attached at a distal end of a bottom hole assembly (BHA) 62. In the illustrated embodiment, the BHA 62 may be coupled between the drill bit 28 and the drill pipe section 20 of the drill string 18. The BHA 62 may include a rotary steerable tool, designated generally as 64 in FIG. 1, with various sensors to provide information about the formation 30 and downhole drilling parameters. The sensors in the rotary steerable tool 64 may include, but are not limited to, a device for measuring the formation resistivity near the drill bit, a gamma ray device for measuring the formation gamma ray intensity, devices for determining the inclination and azimuth of the drill string, and pressure sensors for measuring drilling fluid pressure downhole. The rotary steerable tool 64 may also include additional/alternative sensing devices for measuring shock, vibration, torque, telemetry, etc. The above-noted devices may transmit data to a downhole transmitter 66, which in turn transmits the data uphole to the surface control unit 54. In some embodiments, the BHA 62 may also include a measuring while drilling (MWD) system or a logging while drilling (LWD) system.

In some embodiments, a mud pulse telemetry technique may be used to communicate data from downhole sensors and devices during drilling operations. In other embodiments, the system 10 may utilize electromagnetic telemetry, acoustic telemetry, and wired drill pipe telemetry, among others. The transducer 56 placed in the mud supply line 46 may detect mud pulses responsive to the data transmitted by the downhole transmitter 66. The transducer 56 in turn may generate electrical signals, for example, in response to the mud pressure variations and transmit such signals to the surface control unit 54. In other embodiments, other telemetry techniques such as electromagnetic and/or acoustic techniques or any other suitable techniques known or hereinafter developed may be utilized. By way of example, hardwired drill pipe may be used to communicate between the surface and downhole devices. In another example, combinations of the techniques described may be used. As illustrated in FIG. 1, a surface transmitter receiver 68 may communicate with downhole tools using, for example, any of the transmission techniques described, such as a mud pulse telemetry technique. This may enable two-way communication between the surface control unit 54 and the downhole tools described below.

According to aspects of this disclosure, the rotary steerable tool 64 may include gamma detection sensors disposed in a rotating portion of the rotary steerable tool 64. Similar techniques may be used to provide gamma detection sensors in rotating portions of other downhole components near the drill bit 28 (e.g., BHA 62 proximate a directional drill bit). By placing the gamma detection sensors in a rotatable portion of the downhole system near the drill bit, the gamma detection sensors may provide relatively accurate measurements of detected gamma radiation within downhole formations at a position near the drill bit 28. As a result, decisions for controlling the trajectory of the rotary steerable tool 64 may be made relatively quickly based on the detected gamma radiation, in order to advance the wellbore 22 into desired zones of the formation 30.

Figure 2:
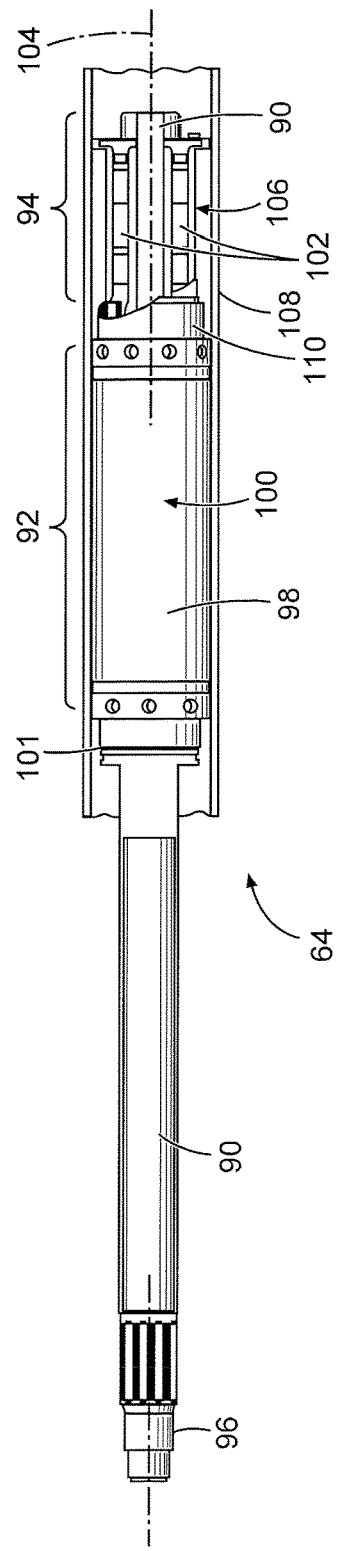
FIG. 2 is a partial cutaway side view of components of a rotary steerable tool, in accordance with an embodiment of the present disclosure.

FIG. 2 is a more detailed illustration of an embodiment of the disclosed rotary steerable tool 64. The rotary steerable tool 64 may include, among other things, a drive shaft 90, an electronics insert assembly 92, and a gamma sensor assembly 94. The drive shaft 90 may be coupled between the drill string 18 and the drill bit 28 of FIG. 1 when the rotary steerable tool 64 is in use. In some embodiments, the drive shaft 90 may include a drill string connection 96 formed at one end thereof for coupling the rotary steerable tool 64 to the drill string.

The electronics insert assembly 92 may include a housing 98 disposed around various electronics 100 that may be used to process signals from downhole sensing components and/or to control operation of the rotary steering tool 64. The electronics 100 may include one or more processor components, memory components, storage components, and so forth designed for the execution of various instructions relating to rotary steerable sensing and control. For example, the electronics 100 may include a signal processor programmed to receive a signal indicative of a detected amount of gamma radiation emitted by the formation from the gamma sensor assembly 94. In addition, the electronics 100 may include one or more processors programmed to execute instructions for outputting a control signal to adjust a trajectory of the rotary steerable tool 64 based on a signal received from the surface and/or a signal received from the gamma sensor assembly 94. Furthermore, the electronics 100 may include a storage component for storing a log of the amount of gamma radiation detected via the gamma sensor assembly 94 over a period of time. Still other electronics 100 may be present within the electronics insert assembly 92.

The housing 98 of the electronics insert assembly (or insert) 92 may function as a pressure vessel for holding the electronics 100 at a desired pressure. Maintaining the insert 92 at this desired pressure (e.g., atmospheric pressure) may facilitate operation of the electronics 100 disposed therein as the rotary steerable tool 64 is disposed down the wellbore. In some embodiments, the wall of the housing 98 may be relatively thick in order to accommodate the desired internal pressure of the insert 92. The drive shaft 90 may extend through a bore formed in the electronics insert 92. The insert 92 may be coupled to the drive shaft 90 (e.g., via a connection component 101), thus enabling rotation of the insert 92 in response to rotation of the drive shaft 90 used to turn the drill bit.

The gamma sensor assembly 94 may be an entirely separate component from the insert assembly 92 holding the electronics 100. The gamma sensor assembly 94 may be a sonde-based assembly including one or more gamma detection sensors 102 disposed therein. The term "sonde" may refer to an encapsulated sensor that is contained separately from other sensors. The gamma detection sensors 102 may be shaped as elongated tubes that are aligned longitudinally along an axis 104 of the rotary steerable tool 64. As illustrated, the gamma detection sensors 102 may be disposed circumferentially around a periphery of the drive shaft 90, which extends through the gamma sensor assembly 94.

As described in detail below, the gamma sensor assembly 94 may also include a pressure sleeve assembly 106 used to isolate the individual gamma detection sensors 102 at a desired pressure. The walls of the sondes used in the pressure sleeve assembly 106 may be relatively thinner than the housing 98 of the insert 92. In addition to the walls of the individual sondes defined by the pressure sleeve assembly 106, the gamma sensor assembly 94 may also be disposed in a housing 108 of the rotary steerable tool 64. This housing 108 may be used for holding the insert electronics as well as the sensor equipment, although the housing 108 is generally not configured for use as a pressure vessel.

The gamma sensor assembly 94 may be coupled to the drive shaft 90 and/or coupled to the insert assembly 92 in order to be rotatable in response to rotation of the drive shaft 90. To that end, the gamma sensor assembly 94 may include a connector component 110 used to fasten the gamma sensor assembly 94 to a distal end of the insert 92 and/or to an outer periphery of the drive shaft 90. In other embodiments, different types or arrangements of connectors may be used to couple the gamma sensor assembly 94 to the drive shaft 90 and/or insert assembly 92. As illustrated, the drive shaft 90 may extend through a bore formed in the gamma sensor assembly 94.

In presently disclosed embodiments, the gamma sensor assembly 94 may be rotatable in response to rotation of the drive shaft 90, and the gamma sensor assembly 94 may be disposed proximate the drill bit used with the rotary steerable tool 64. For example, in the illustrated embodiment, the gamma sensor assembly 94 may be positioned between the insert assembly 92 and the end of the drive shaft 90 designed to couple with the drill bit. Other embodiments of the rotary steerable tool 64 may include other relative arrangements of the components making up the tool 64 with respect to one another along a length of the tool 64.

The disclosed rotary steerable tool 64 may enable more effective real-time measurements of the gamma radiation from the formation to be taken using the gamma sensor assembly 94 located close to the drill bit. In addition, by enabling the gamma sensor assembly 94 to rotate with the drive shaft 90, the disclosed tool 64 may be used to provide directional gamma measurements as well as bulk gamma measurements using the relatively accurate gamma sensor assembly 94 located at the end of the tool 64. The sonde-based design may also provide a minimized thickness (and therefore density) between the gamma detection sensors 102. This decreased density may increase the sensitivity of the individual gamma detection sensors 102, since less material is blocking incoming gamma radiation. In addition, the decreased thickness may allow more gamma detection sensors 102 to be disposed in the assembly using an efficient spatial arrangement. This may ultimately increase the amount and quality of gamma sensor data that can be collected through the gamma sensor assembly.

Figure 3:
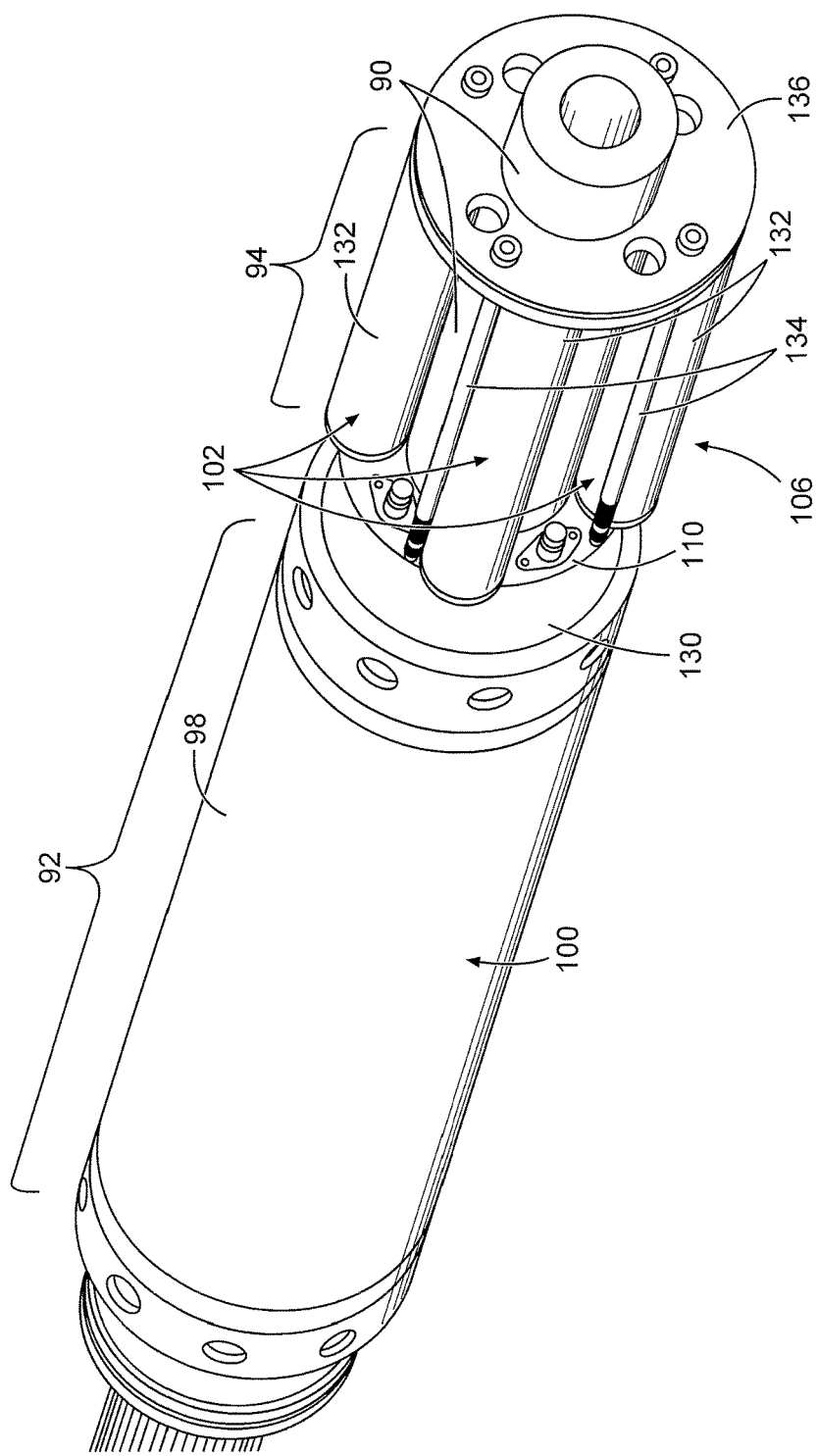
FIG. 3 is a perspective view of components of the rotary steerable tool of FIG. 2, in accordance with an embodiment of the present disclosure.
Figure 4:
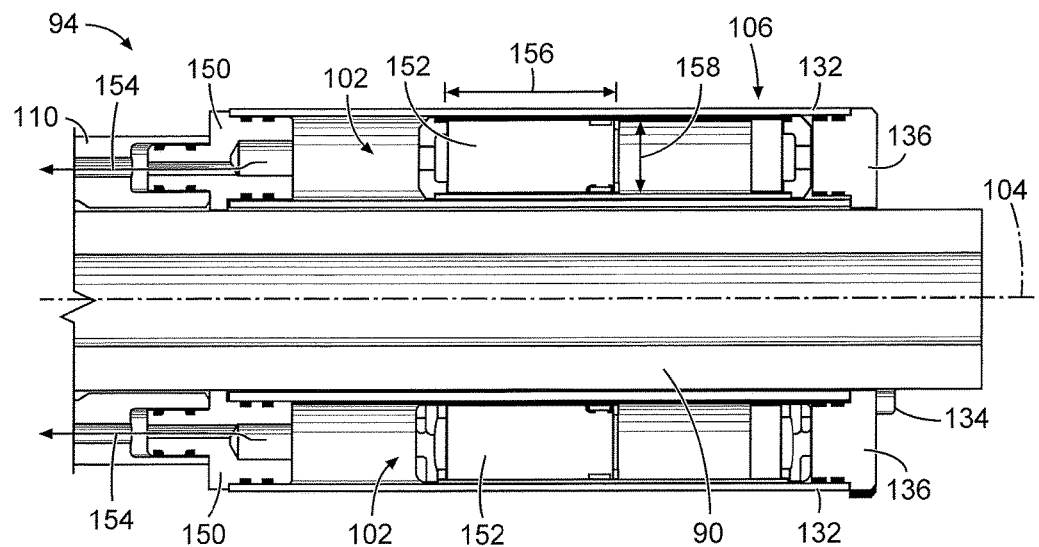
FIG. 4 is a cross-sectional side view of a gamma sensing section of the rotary steerable tool of FIGS. 2 and 3, in accordance with an embodiment of the present disclosure.

FIG. 3 illustrates a more detailed embodiment of the rotary steerable tool 64 having the gamma sensor assembly 94 coupled to an end 130 of the insert assembly 92 with the drive shaft 90 extending therethrough. As shown, the gamma detection sensors 102 may be disposed in individual pressure sleeves 132 that make up the pressure sleeve assembly 106.

This sonde-based design may help to increase the pressure rating of the gamma detection sensors 102 when compared to more conventional insert-based designs. That is, instead of the gamma detections sensors 102 all being disposed with the larger insert housing 98, the gamma detection sensors 102 may be disposed one in each of the individual pressure sleeves 132 of the pressure sleeve assembly 106. The insert 92 may utilize a relatively thick-walled housing 98 in order to maintain the larger pressure vessel (insert 92) at the desired pressure. However, the individually contained gamma detection sensors 102 may each be kept at a desired atmospheric pressure via a pressure sleeve 132 sized with a smaller wall thickness due to the lower volume of the pressure sleeve 132 (compared to the insert 92). Thus, the gamma detection sensors 102 may be arranged so that less material is disposed between the sensors 102 and the gamma radiation from the formation, enabling a more sensitive data measurement via the gamma detection sensors 102.

Additionally, the sonde-based design may provide relatively easy access to the one or more gamma detection sensors 102 of the rotary steerable tool 64 for services, maintenance, repairs, etc. This is because the gamma detection sensors 102 may be disposed outside of the larger electronics insert assembly 92. Instead of an operator having to open the pressure vessel housing 98 of the insert 92, the operator may just remove a non-pressurized housing (e.g., 108 from FIG. 2) from the gamma sensor assembly 94 to access the individual gamma detection sensors 102. Thus, an operator may perform evaluations, repairs, and any other desired services on the gamma detection sensors 102 without having to disassemble the electronics insert assembly 92.

The sonde-based arrangement of the gamma detection sensors 102 disposed in the pressure sleeve assembly 106 may also help to simplify the assembly procedure of the rotary steerable tool 64, since the gamma detection sensors 102 do not have to be fitted within the insert 92 holding the electronics 100. Indeed, some embodiments of the gamma sensor assembly 94 may be retro-fit onto existing rotary steerable tools having the insert 92 and the drive shaft 90 (but no or limited gamma sensor components). To that end, the gamma sensor assembly 94 may be disposed over the drive shaft 90 of an existing rotary steerable tool proximate the electronics insert 92 of the tool. The gamma sensor assembly 94 may then be fixed to the end 130 of the insert 92 (e.g., using bolts to couple the connection component 110 to the end 130). Electrical and other connections may be made up between the connection component 110 and the end 130 of the insert assembly 92.

As illustrated, the gamma sensor assembly 94 may be equipped with bolts 134 or some other connector mechanism disposed between the connection component 110 at one end and another connection component 136 (or end cap) at the opposite end. The bolts 134 may generally be used to secure the pressure sleeves 132 and the end cap 136 to the electronics insert 92. The connection component/end cap 136 may also be used to couple the gamma sensor assembly 94 to the drill bit (not shown). Other types of connectors (e.g., electrical) and fluid lines may be disposed between the two connection components 110 and 136 of the gamma sensor assembly 94 to provide desired communication between components of the insert assembly 92 and components of the drill bit (or other parts of the rotary steerable tool).

Figure 5:
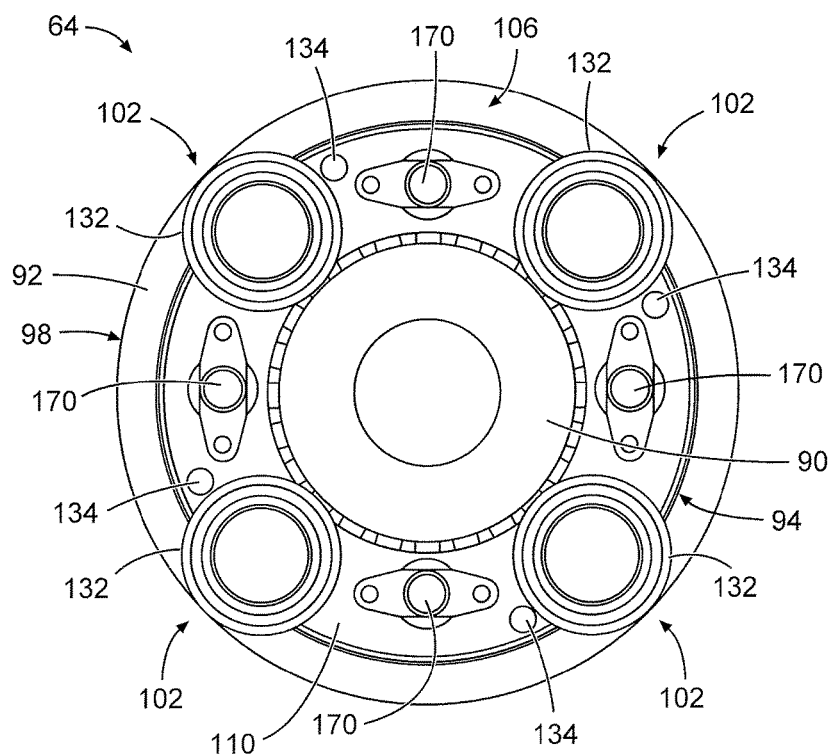
FIG. 5 is a front cutaway view of components of the rotary steerable tool of FIGS. 3 and 4, in accordance with an embodiment of the present disclosure.

FIG. 5 illustrates a cross-sectional view of the gamma sensor assembly 94 used to take gamma radiation readings in the rotary steerable tool 64. As illustrated, the gamma sensor assembly 94 may include at least two gamma detection sensors 102 disposed on opposite sides of the drive shaft 90 relative to the axis 104. Each of the gamma detection sensors 102 may be disposed in a corresponding pressure sleeve 132, as mentioned above. In the illustrated embodiment, each pressure sleeve 132 of the pressure sleeve assembly 106 may be equipped with a portion of the end cap 136 sealingly disposed at each end of the pressure sleeve 132, in order to seal the pressure sleeve 132 at the desired pressure.

The gamma detection sensors 102 may include scintillator sensors designed to emit energy when excited by ionizing radiation (specifically gamma radiation in present embodiments). In some embodiments, the gamma detection sensors 102 may each include a photomultiplier tube (PMT) coupled to a scintillator. In other embodiments, the gamma detection sensors 102 may each include a Geiger Muller (GM) tube coupled to a scintillator for detecting gamma radiation from the formation. It may be desirable to use PMT sensors in some embodiments since these types of gamma detection sensors 102 may be operable at relatively high differential pressures (e.g., downhole pressures). In addition, PMT sensors are currently produced in sizes having a cross-sectional area (e.g., diameter of approximately 1 inch) that can be easily fit into the pressure sleeves 132 of the disclosed pressure sleeve assembly 106 without compromising the pressure rating of the sensor. That is, the PMT sensors may be sized for placement in the pressure sleeves 132 without requiring a pressure sleeve with a relatively high diameter and subsequently large wall thickness. Instead, the PM sensors may allow relatively low wall thicknesses of the pressure sleeves 132, thereby decreasing the density of material surrounding the gamma detection sensors 102 and ensuring a high effective sensitivity of the gamma detection sensors 102.

In the illustrated embodiment, the gamma detection sensors 102 may include PMT sensors. In these sensors, a photomultiplier crystal 152 may be disposed in the gamma detection sensor 102, and this crystal 152 may emit light in response to the sensor absorbing gamma radiation. In some embodiments, the gamma detection sensor 102 may include a photo-detector for sensing the light emitted from the crystal 152 and outputting a signal indicative of the detected gamma radiation. In other embodiments, the gamma detection sensor 102 may include a fiber-optic or similar type of cable moving outward from the sensor 102. The gamma sensor assembly 94 may include paths 154 formed through the connection component 110 leading to each corresponding gamma detection sensor 102, in order to facilitate communication of sensor signals from the gamma detection sensors 102 to the electronics in the insert assembly.

The gamma detection sensors 102 may be of any desirable length in the disclosed gamma sensor assembly 94. In general, a detection sensor 102 having a longer length may operate with a higher sensitivity than a sensor of the same diameter and a shorter length. Specifically, a higher ratio of a length dimension 156 to a diameter dimension 158 of the crystal 152 may generally correlate to a higher sensitivity of the sensor, up to a certain limit depending on the sensor type. For example, the aspect ratio of crystal length to diameter that gives the greatest sensitivity may be approximately 6 to 1 in PMTs. Accordingly, it may be desirable to construct the gamma sensor assembly 94 with gamma detection sensors 102 that are as long as possible. As illustrated, the gamma detection sensors 102 may be arranged in a longitudinal alignment with the axis 104 within the pressure sleeve assembly 106.

FIG. 5 illustrates a cutaway view of the rotary steerable tool 64 taken in a direction perpendicular to the longitudinal axis 104 of the rotary steerable tool 64. In the illustrated embodiment, the gamma sensor assembly 94 includes a plurality of gamma detection sensors 102. It may be desirable to arrange as many gamma detection sensors 102 as possible within the gamma sensor assembly 94, in order to increase an overall tool sensitivity to bulk gamma radiation in the wellbore environment.

Due to limitations in space for arranging the gamma sensor assembly 94, the illustrated embodiment may include four gamma detection sensors 102, each one being individually set into a respective pressure sleeve 132. The pressure sleeves 132 may be arranged in the pressure sleeve assembly 106 at 90 degree angles from each other about the axis 104. The pressure sleeves 132 may be circumferentially positioned around a periphery of the drive shaft 90. In other embodiments, other numbers and relative arrangements of the individual gamma detection sensors 102 may be utilized in the disclosed gamma sensor assembly 94 of the rotary steerable tool 64.

In the illustrated embodiment, the gamma sensor assembly 94 may also include one or more electrical connectors 170 disposed on the connector component 110 to provide a desired communication connection between various electrical lines that may be selectively coupled to the insert assembly 92. For example, the electrical connectors 170 may include a six-pin connector. An electrical cable may be coupled to one or more of the electrical connectors 170 to provide control communication between, for example, the insert assembly 92 and a hydraulic actuating unit located lower on the rotary steerable tool 64. These connectors 170, along with the hydraulic lines 134, may facilitate a relatively easy assembly or retro-fit of the rotary steerable tool 64 since they allow the rotatable gamma sensor assembly 94 to be added between any two components of the rotary steerable tool 64 (e.g., near bit) while still providing the desired connections between these components.

As discussed above, it may be desirable to provide relatively sensitive gamma measurements using the gamma sensor assembly 94 in the rotary steerable tool 64. This may be accomplished in a number of ways using the disclosed sonde-based gamma sensor design. Specifically, the gamma measurement sensitivity of the overall rotary steerable tool 64 may increase as the number of gamma detection sensors 102 increase within the assembly. In addition, the measurement sensitivity may increase as a result of a decrease in the amount of material (i.e., sleeve or housing thickness) between the gamma detection sensors 102 and the formation. The sonde-based detection assembly makes use of noticeably thinner housings of the pressure sleeves 132 and possibly another housing disposed over the pressure sleeves 132, as opposite to the relatively thick-walled housing 98 of the insert assembly 92. The lower pressure sleeve thickness may be designed under a proper pressure rating that allows better measurements sensitivities for bulk gamma measurements.

The reduced thickness of the pressure sleeves 132 may reduce the space constraints within the gamma sensor assembly 94. This reduction of space constraints may facilitate a usage of more sensitive PMTs (as shown), instead of GM tubes. Furthermore, the reduced space taken up by the pressure sleeve assembly 106 may enable more gamma detection sensors 102 to be used overall, thereby further increasing measurement sensitivity.

Increased sensitivity of the gamma sensor assembly 94 may result in increased accuracy in identifying subsurface formations. This may increase the reliability of the rotary steerable tool 64 as well as reduce the time required to evaluate the formations while drilling. The reduced evaluation time may enable an operator or controller to make quicker steering decisions for adjusting and improving wellbore placement. In addition, as discussed above, the gamma sensor assembly 94 may be disposed near the drill bit of the rotary steerable tool 64, thus enabling the system to accurately identify the formations at a position near the bit during drilling operations. Further, the gamma sensor assembly 94 is rotatable with the drive shaft 90 and, as a result, may provide desirable types of measurements considering gamma radiation detected from all directions within the formation.

In some embodiments, the individual gamma detection sensors 102 may not be able to determine the direction from which the gamma ray is emitted. Rather, the gamma detection sensor 102 is able to detect the collision of the gamma ray with the scintillator crystal. Therefore, a direction of the gamma ray source may be determined, statistically, when there is a difference in the probability of the gamma ray reaching the scintillator crystal based on the gamma ray's direction of travel. This probability difference may be achieved by shielding or attenuating gamma rays from reaching the gamma detection sensors 102 in certain directions.

Figure 6:
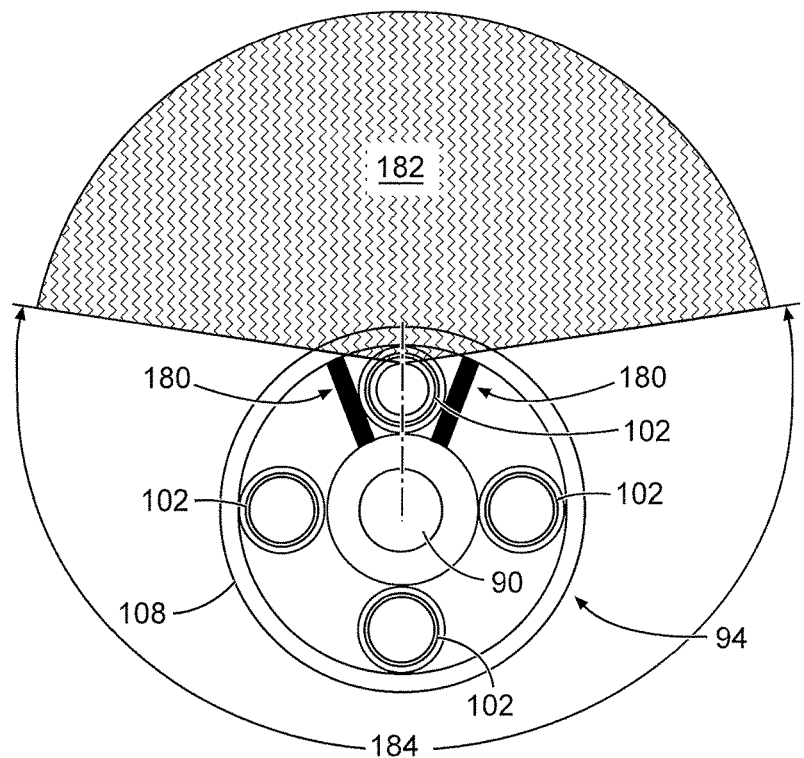
FIG. 6 is a schematic cross-sectional view of the gamma sensing section of FIG. 3 having two shielding components used to facilitate an azimuthal gamma measurement, in accordance with an embodiment of the present disclosure.

FIG. 6 shows an embodiment of the gamma sensor assembly 94 with one of the gamma detection sensors 102 being shielded on two sides via shielding components 180. The shielding components 180 may be plates or other inserts formed from tungsten, or some other material that attenuates gamma rays. The shielding components 180 may be used to narrow the range of azimuthal directions in which gamma rays 182 may be detected via the gamma detection sensor 102.

As shown in FIG. 6, the shielded gamma detection sensor 102 is able to more easily detect gamma rays 182 coming from a certain direction or range of rotational angles around the gamma detection sensor 102. Gamma rays that may be emitted from an opposite side or range of angles 184 relative to the gamma detection sensor 102 may be generally blocked from reaching the sensor by the shielding components 180 as well as by the drive shaft 90. Accordingly, the shielding components 180 may facilitate an azimuthal (or directional) measurement of gamma radiation via the shielded gamma detection sensor 102. As the rotary steering tool rotates the gamma sensor assembly 94 about the axis, the directional gamma measurements may be evaluated along with a sensed depth and/or orientation of the rotating portions of the tool within the wellbore.

Figure 7:
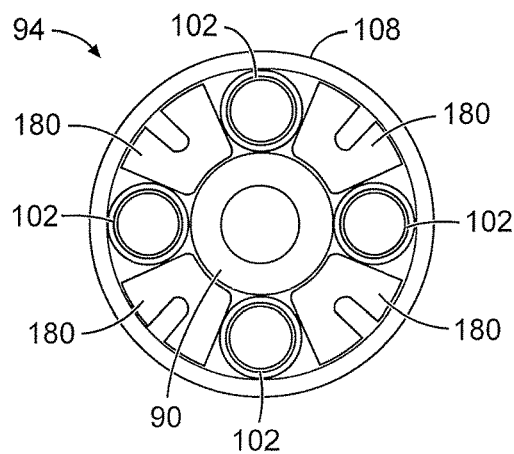
FIG. 7 is a schematic cross-sectional view of the gamma sensing section of FIG. 3 with four shielding components used to facilitate azimuthal gamma measurements, in accordance with an embodiment of the present disclosure.

FIG. 7 illustrates another embodiment of the gamma sensor assembly 94 using multiple shielding components 180 disposed between adjacent gamma detection sensors 102. It should be noted that the sonde-based arrangement of the gamma detection sensors 102 within the gamma sensor assembly 94 may facilitate the placement of such shielding inserts 180 without adding substantial bulk to the packaged sensor assembly 94. Indeed, as shown, all the shielding components 180 may generally fit within the housing 108 of the rotary steerable tool, in positions between the gamma detection sensors 102. Any desirable number or arrangement of these shielding components 180 may be used to provide the desired directional gamma measurements.

In some embodiments, the shielding components 180 may be removably disposed within the gamma sensor assembly 94 while the rotary steerable tool is being configured at a shop location or at the surface of a wellsite. In other embodiments, the shielding components 180 may be designed to be selectively actuated into position while the rotary steerable tool is positioned downhole. For example, the shielding components 180 may be initially positioned within another component of the rotary steerable tool adjacent the gamma sensor assembly 94, and these shielding components 180 may be hydraulically actuated from this position to the position between the gamma detection sensors 102. This actuation of the shielding components 180 into positions between the sensors 102 may be controlled based on a desired type of gamma measurement to be obtained. That is, when bulk gamma measurements are requested, a control component may actuate the shielding components 180 into a position away from the gamma detection sensors 102. Likewise, when directional gamma measurements are requested, the control component may actuate one or more of the shielding components 180 into position between the gamma detection sensors 102 to provide the azimuthal shielding.

Figure 8:
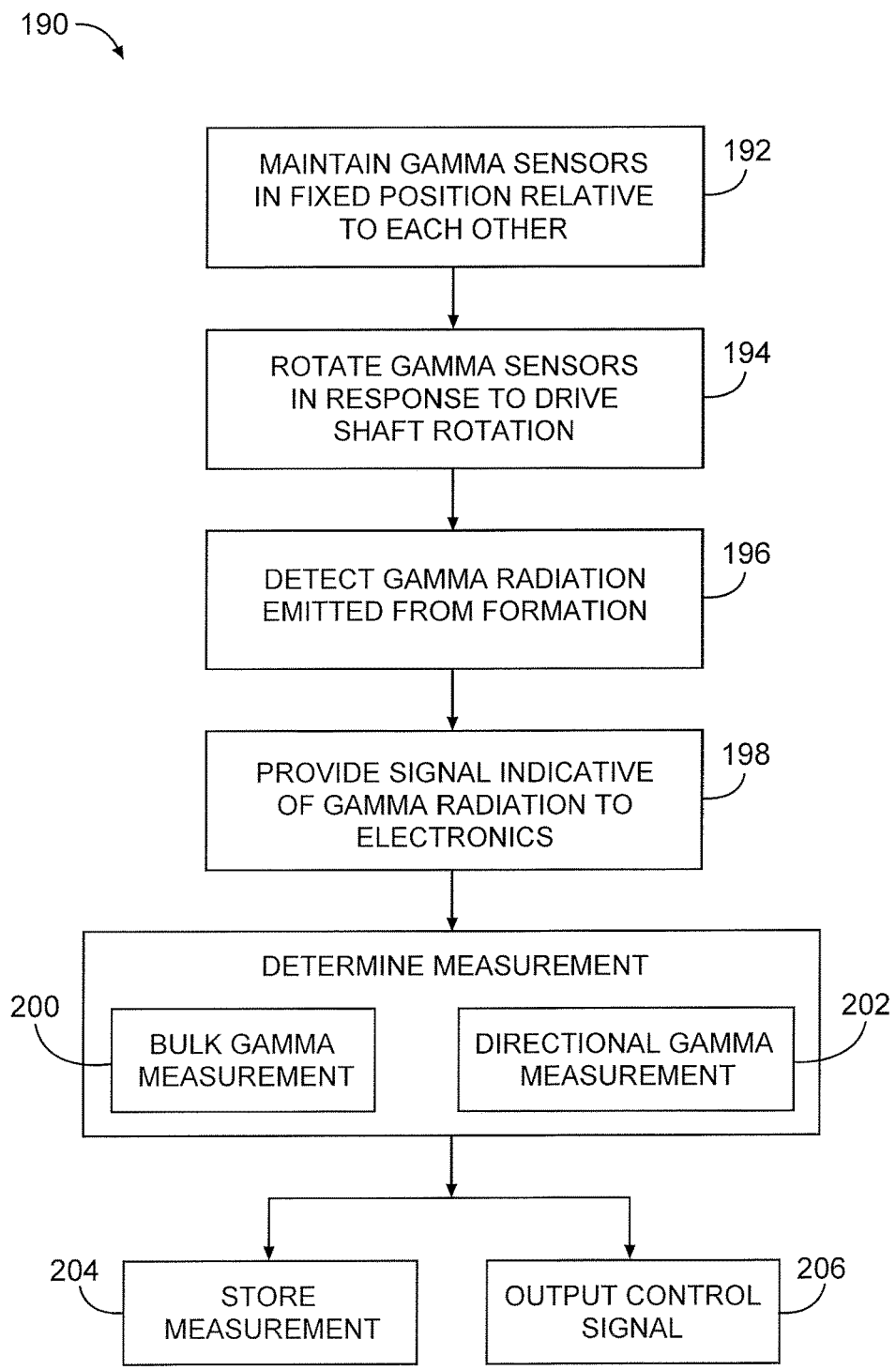
FIG. 8 is a process flow diagram illustrating a method for operating a gamma sensing assembly of a rotary steerable tool, in accordance with an embodiment of the present disclosure.

The disclosed rotary steerable tool 64 may obtain gamma radiation sensor data and evaluate the formations using this data according to a method 190, as illustrated in FIG. 8. It should be noted that certain parts of the method 190 may be implemented as a computer or software program (e.g., code or instructions) that may be executed by an electronic processor in the insert assembly 92 to execute one or more of the steps of the method 190. Additionally, the program (e.g., code or instructions) may be stored in any suitable article of manufacture that includes at least one tangible non-transitory, computer-readable medium that at least collectively stores these instructions or routines, such as a memory component or a storage component disposed in the electronics insert assembly 92.

The method 190 may include maintaining (block 192) the gamma detection sensors in fixed positions relative to each other and coupled between an end of an electronics insert assembly and the drill bit. The method 190 also may include rotating (block 194) the electronics insert and the gamma detection sensors in response to the drive shaft rotation. In addition, the method 190 may include detecting gamma radiation (block 196) emitted from the subterranean formation via the sensors and providing a signal (block 198) indicative of the detected gamma radiation from the sensors to the electronics in the insert assembly.

Upon receiving the signal, the electronics may determine a bulk gamma measurement (block 200) based on the signal taken in all directions relative to the rotary steerable tool over a period of time. This type of data acquisition may be relatively easy to implement when the gamma detection sensors (e.g., PMTs) have a lower sensitivity, since the quantity of counts provided in the signal while the tool is rotating may be too low to provide immediate feedback. To determine the bulk gamma measurement, the electronics may receive signals from each of the sensors over a relatively long sampling period and average the measurements in all directions. This may help to resolve any signal fluctuations due to slow count rates from the sensors. Although the bulk gamma measurement is an average measurement from all directions, drillers can look at trends in radiation level changes in order to decide where to stop the tool to take more specific directional measurements as desired. The bulk gamma measurement may yield a relatively high combined count rate (or sensitivity) of the overall sensor measurements.

In other embodiments, upon receiving the signal, the electronics may determine a directional gamma measurement (block 202) while the rotary steerable tool is rotating. Relatively accurate directional gamma measurements may be taken using gamma detection sensors with a relatively high sensitivity (e.g., count rate). To determine the gamma measurements in a specific direction, the rotary steerable tool may include one or more sensors for determining a directional measurement while the tool rotates. This directional measurement may be tracked and recorded as an angle of the sensor assembly relative to a reference point on a housing (e.g., approximately geo-stationary outer housing)

of the rotary steerable tool. The directional gamma measurements may be taken for different angular regions that are arranged around the axis of the tool. These angular regions may be arranged in many fashions, such as using multiple equally sized regions around the axis, or using an number of irregularly sized larger and smaller regions. The electronics may account for a relative rotation between the insert assembly and the reference point.

After determining either the bulk gamma measurement (200) or the directional gamma measurement (202), the electronics assembly may store (block 204) the measurements onboard the tool. In some embodiments, the electronics assembly may output a control signal (block 206) for controlling a deflection or other operating parameter of the rotary steerable tool to change trajectories of the tool through the formation (e.g., in response to a directional gamma measurement). In other embodiments, the electronics assembly may generate and output a signal indicative of the gamma measurement (bulk or directional) to a telemetry module for communicating the signal to a surface control component. From here, the signal may provide a log to operators at the surface, and in some cases the signal may be used to control a speed of rotation of the drill string and rotary steerable tool.

Embodiments disclosed herein include:

A. A rotary steerable tool for use in drilling a wellbore through a subterranean formation, the rotary steerable tool including a drive shaft, a pressure sleeve assembly, and a gamma detection sensor. The drive shaft is extending through the rotary steerable tool for turning a drill bit. The pressure sleeve assembly is disposed proximate the drill bit and coupled to the drive shaft and rotatable in response to rotation of the drive shaft. The gamma detection sensor is arranged within the pressure sleeve assembly for sensing gamma radiation emitted from the subterranean formation.

B. A rotatable gamma sensing section for use in a rotary steerable tool, wherein the rotatable gamma sensing section includes a plurality of gamma detection sensors, a connector component, and a pressure sleeve assembly. The plurality of gamma detection sensors are used for detecting gamma radiation emitted from a subterranean formation. The connector component is coupled to the plurality of gamma detection sensors for holding the plurality of gamma detection sensors in a fixed position relative to each other and for coupling the rotatable gamma sensing section to a rotatable component of the rotary steerable tool. The connector component includes a bore formed therethrough to accommodate a drive shaft extending through the rotary steerable tool. The pressure sleeve assembly includes a plurality of pressure sleeves coupled to each other via the connector component, wherein each of the plurality of gamma detection sensors are disposed in a corresponding one of the plurality of pressure sleeves. The plurality of gamma detection sensors, the pressure sleeve assembly, and the connector component are rotatable about an axis in response to rotation of the drive shaft.

C. A method for operating a rotary steerable tool includes maintaining a plurality of sensors in fixed positions relative to each other and coupled to a rotatable component of the rotary steerable tool. The method also includes rotating the electronics insert and the plurality of sensors in response to a drive shaft turning a drill bit of the rotary steerable tool. In addition, the method includes detecting gamma radiation emitted from a subterranean formation via the plurality of sensors. Further, the method includes providing a signal indicative of the detected gamma radiation from the plurality of sensors to electronics disposed in an electronics insert of the rotary steerable tool.

Each of the embodiments A, B, and C may have one or more of the following additional elements in combination: Element 1: wherein the pressure sleeve includes a sonde. Element 2: wherein the gamma detection sensor includes a photomultiplier tube, a Geiger Muller (GM) tube, or another gamma detection sensor that can fit in the sonde. Element 3: wherein the pressure sleeve assembly includes a pressure sleeve for holding the gamma detection sensor at atmospheric pressure. Element 4: further including a plurality of gamma detection sensors arranged within the pressure sleeve assembly. Element 5: wherein the pressure sleeve assembly includes a plurality of pressure sleeves arranged circumferentially around the drive shaft, wherein each of the plurality of pressure sleeves holds a corresponding one of the plurality of gamma detection sensors, and wherein the pressure sleeves are arranged in a longitudinal orientation relative to the drive shaft. Element 6: further including a connector component disposed at a distal end of the pressure sleeve assembly for holding each of the plurality of gamma detection sensors in a fixed position relative to each other and enabling rotation of the sleeve assembly in response to a rotation of the drive shaft. Element 7: further including an insert assembly comprising a first housing disposed around electronics, wherein the insert assembly is rotatable in response to rotation of the drive shaft, wherein the sleeve assembly is coupled between the insert assembly and the drill bit. Element 8: further including a second housing disposed around the sleeve assembly, wherein a thickness of the first housing is greater than a thickness of the second housing. Element 9: further including an electrical connector coupled between the sleeve assembly and the insert assembly to provide electrical communication between a hydraulic actuating unit and the electronics of the insert assembly. Element 10: further including a removable shielding component disposed proximate the gamma detection sensor to narrow an azimuthal detection range of the gamma detection sensor.

Element 11: wherein a wall of each of the plurality of pressure sleeves has a thickness less than a housing thickness of the rotatable component. Element 12: wherein the plurality of gamma detection sensors are arranged circumferentially about the axis. Element 13: further including one or more shielding components disposed between the plurality of gamma detection sensors to narrow an azimuthal detection range of at least one of the plurality of gamma detection sensors. Element 14: further including one or more electrical connectors formed in the connector component. Element 15: further including one or more fluid lines extending from the connector component.

Element 16: further including determining a bulk gamma measurement based on the signal indicative of the gamma radiation emitted from the subterranean formation in all directions relative to the rotary steerable tool, detected via the plurality of sensors over a period of time. Element 17: further including actuating one or more shielding components into positions between the plurality of sensors, and determining a directional gamma measurement based on the signal indicative of the gamma radiation emitted from the subterranean formation in a given direction relative to the rotary steerable tool.

Although the present disclosure and its advantages have been described in detail, it should be understood that various changes, substitutions and alterations can be made herein without departing from the spirit and scope of the disclosure as defined by the claims.

What is claimed is:

1. A rotary steerable tool for use in drilling a wellbore through a subterranean formation, comprising:
   a drive shaft extending through the rotary steerable tool for turning a drill bit;
   a pressure sleeve assembly comprising a plurality of pressure sleeves each disposed proximate the drill bit, coupled to the drive shaft, and rotatable with rotation of the drive shaft; and
   a plurality of gamma detection sensors contained within the pressure sleeve assembly for sensing gamma radiation emitted from the subterranean formation;
   wherein each of the gamma detection sensors is positioned in a corresponding one of the plurality of pressure sleeves in the pressure sleeve assembly; and
   wherein each pressure sleeve is a self-contained tube, wherein a central longitudinal axis of each tube is radially offset from a central longitudinal axis of the drive shaft.

2. The rotary steerable tool of claim 1, wherein each of the gamma detection sensors comprises a photomultiplier tube, a Geiger Muller (GM) tube, or another gamma detection sensor that can fit in the corresponding pressure sleeve.

3. The rotary steerable tool of claim 1, wherein the plurality of pressure sleeves hold the gamma detection sensors at atmospheric pressure.

4. The rotary steerable tool of claim 1, further comprising a connector component disposed at a distal end of the pressure sleeve assembly for holding each of the plurality of pressure sleeves in a fixed position relative to each other and enabling rotation of the sleeve assembly in response to a rotation of the drive shaft.

5. The rotary steerable tool of claim 1, further comprising an insert assembly comprising a first housing disposed around electronics, wherein the insert assembly is rotatable in response to rotation of the drive shaft, wherein the sleeve assembly is coupled between the insert assembly and the drill bit.

6. The rotary steerable tool of claim 5, further comprising a second housing disposed around the plurality of pressure sleeves, wherein a thickness of the first housing is greater than a thickness of the second housing.

7. The rotary steerable tool of claim 5, further comprising an electrical connector coupled between the sleeve assembly and the insert assembly to provide electrical communication between a hydraulic actuating unit and the electronics of the insert assembly.

8. The rotary steerable tool of claim 1, further comprising a removable shielding component disposed proximate the gamma detection sensor to narrow an azimuthal detection range of the gamma detection sensor.

9. The rotary steerable tool of claim 1, wherein each of the tubes is elongated in a direction parallel to the central longitudinal axis of the drive shaft.

10. The rotary steerable tool of claim 1, wherein the tubes are disposed circumferentially around a periphery of the drive shaft.

11. A rotatable gamma sensing section for use in a rotary steerable tool, wherein the rotatable gamma sensing section comprises:
    a plurality of gamma detection sensors for detecting gamma radiation emitted from a subterranean formation;
    a pressure sleeve assembly comprising a plurality of pressure sleeves, wherein each of the plurality of gamma detection sensors is contained in a corresponding one of the plurality of pressure sleeves; and
    a connector component coupled to the plurality of pressure sleeves, wherein the connector component holds the plurality of gamma detection sensors in a fixed position relative to each other and is configured to couple rotatable gamma sensing section to a rotatable component of the rotary steerable tool, wherein the connector component comprises a bore formed therethrough to accommodate a drive shaft extending through the rotary steerable tool;
    wherein each pressure sleeve comprises a self-contained tube, wherein a central longitudinal axis of each tube is radially offset from a drive shaft longitudinal axis;
    wherein the plurality of gamma detection sensors, the pressure sleeve assembly, and the connector component are rotatable about the drive shaft longitudinal axis in response to rotation of the drive shaft.

12. The rotatable gamma sensing section of claim 11, wherein the rotatable component comprises an electronics insert having electronics disposed within a pressure vessel, and wherein a wall of each of the plurality of pressure sleeves has a thickness less than a thickness of the pressure vessel of the rotatable component.

13. The rotatable gamma sensing section of claim 11, wherein the tubes are disposed circumferentially around the drive shaft longitudinal axis.

14. The rotatable gamma sensing section of claim 11, further comprising one or more shielding components removably disposed between at least two of the plurality of gamma detection sensors to narrow an azimuthal detection range of at least one of the plurality of gamma detection sensors.

15. The rotatable gamma sensing section of claim 11, further comprising one or more electrical connectors formed in the connector component.

16. The rotatable gamma sensing section of claim 11, further comprising one or more fluid lines extending from the connector component.

17. The rotary steerable tool of claim 5, wherein the first housing disposed around the electronics of the insert assembly comprises a pressure vessel.

18. A method for operating a rotary steerable tool, comprising:
    maintaining a plurality of sensors in fixed positions relative to each other and coupled to a rotatable component of the rotary steerable tool;
    rotating the electronics insert and the plurality of sensors in response to a drive shaft turning a drill bit of the rotary steerable tool;
    detecting gamma radiation emitted from a subterranean formation via the plurality of sensors; and
    providing a signal indicative of the detected gamma radiation from the plurality of sensors to electronics disposed in an electronics insert of the rotary steerable tool;
    wherein each of the plurality of sensors comprises a gamma detection sensor contained in a corresponding pressure sleeve, wherein the pressure sleeve is a self-contained tube; and
    wherein a central longitudinal axis of each sensor is radially offset from a central longitudinal axis of the drive shaft.

19. The method of claim 18, further comprising determining a bulk gamma measurement based on the signal indicative of the gamma radiation emitted from the subterranean formation in all directions relative to the rotary steerable tool, detected via the plurality of sensors over a period of time.

20. The method of claim 18, further comprising actuating one or more shielding components into positions between the plurality of sensors, and determining a directional gamma measurement based on the signal indicative of the gamma radiation emitted from the subterranean formation in a given direction relative to the rotary steerable tool.

* * * * *